United States Patent [19]
Fahey

[11] 3,856,868
[45] Dec. 24, 1974

[54] SYNTHESIS OF 5-VINYLCYCLOHEXA-1,3-DIENE

[75] Inventor: Darryl R. Fahey, Bartlesville, Okla.

[73] Assignee: Phillips Petroleum Company, Bartlesville, Okla.

[22] Filed: Jan. 11, 1974

[21] Appl. No.: 432,442

Related U.S. Application Data

[63] Continuation of Ser. No. 209,442, Dec. 17, 1971, abandoned.

[52] U.S. Cl. .............................. 260/666 A, 260/668
[51] Int. Cl. ............................................. C07c 3/10
[58] Field of Search ............ 260/666 A, 666 B, 668

[56] References Cited
UNITED STATES PATENTS

| | | | |
|---|---|---|---|
| 2,686,208 | 8/1954 | Reed | 260/666 B |
| 2,686,209 | 8/1954 | Reed | 260/666 B |
| 3,249,641 | 5/1966 | Storrs et al. | 260/666 B |
| 3,271,468 | 9/1966 | Wilke et al. | 260/668 |
| 3,586,727 | 6/1971 | Wilke et al. | 260/666 B |
| 3,629,347 | 12/1971 | Wilke et al. | 260/666 B |

*Primary Examiner*—Delbert E. Gantz
*Assistant Examiner*—Veronica O'Keefe

[57] ABSTRACT

At least one alkyne compound is reacted with butadiene, piperylene and/or isoprene in the presence of the reaction product obtained by reducing a nickel(II) compound in the presence of at least one ligand material having the formula $R_3Z$ wherein Z is phosphorus or arsenic, and each R is an alkyl radical having from 1 to 12 carbon atoms with no branching nearer the Z than the second carbon atom. In a specific embodiment butadiene and acetylene are reacted in the presence of nickel(0) and tri-n-alkylphosphine to produce 5-vinylcyclohexa-1,3-diene and benzene.

10 Claims, No Drawings

SYNTHESIS OF 5-VINYLCYCLOHEXA-1,3-DIENE

This is a continuation of copending application Ser. No. 209,442, filed Dec. 17, 1971, now abandoned.

This invention relates to a new and improved process for reacting at least one alkyne compound with butadiene, piperylene and/or isoprene. In one aspect the invention relates to a new catalyst for the reaction of an alkyne with butadiene or methyl derivative thereof to provide a high yield of a 5-vinylcyclohexa-1,3-diene type compound.

Accordingly, it is an object of the present invention to provide a new and improved process for the reaction of an alkyne with butadiene or methyl derivative thereof to produce 5-vinylcyclohexa-1,3-diene compounds. Another object of the invention is to increase the yield of 5-vinylcyclohexa-1,3-diene compounds.

Other objects, aspects and advantages of the invention will be apparent from a study of the specification and the appended claims to the invention.

The conjugated diolefins which can be utilized in the present process include butadiene, piperylene, isoprene, and admixtures thereof. The alkyne compounds which are useful in the present process have the structure $R-C\equiv C-R$, wherein each R is individually selected from the group consisting of hydrogen, alkyl and fluoroalkyl having 1 to 10 carbon atoms, cycloalkyl having 3 to 8 carbon atoms, aryl and alkaryl having from 6 to 10 carbon atoms, $-R'-O-R''$ wherein $R'$ is alkylene having from 1 to 4 carbon atoms and $R''$ is alkyl having from 1 to 4 carbon atoms, and (for use in the absence of an organometallic or metal hydride reducing agent, vide infra) $-CO-O-R''$ wherein $R''$ is as defined above, and combinations thereof, the number of carbon atoms in any R group being less than 11 and the total number of carbon atoms in the molecule being less than 15. Exemplary alkyne compounds include acetylene, propyne, 1-butyne, 2-butyne, 2-pentyne, 1-hexyne, 2-methylhex-3-yne, 1-octyne, 1-decyne, 2-tetradecyne, cyclopropylacetylene, cyclohexylacetylene, cyclooctylacetylene, phenylacetylene, diphenylacetylene, p-butylphenylacetylene, 4-fluorohex-1-yne, 4-oxapent-1-yne, 5-oxanon-1-yne, 7-oxadec-1-yne, dimethylacetylenedicarboxylate, isobutyl acetylenecarboxylate, and combinations thereof. The mole ratio of the conjugated diolefin to the alkyne compound will generally be in the range of about 0.1 to about 20, preferably in the range of about 0.5 to about 4.

The nickel(II) compound can be selected from those nickel(II) compounds reducible by organometallic and metal hydride reducing agents or by the novel thermal process of the instant invention. Additionally, the anion should not have any significant adverse effect upon the reaction of the nickel(II) compound with the trialkylphosphine or the trialkylarsine or upon the reaction of the conjugated diolefin with the alkyne compound. Exemplary nickel(II) compounds which are suitable include nickel chloride, nickel bromide, nickel acetate, nickel iodide, nickel propionate, nickel cyanide, nickel benzoate, nickel naphthenate, nickel oxalate, nickel acetylacetonate, nickel benzoylacetonate, transbromo(o-tolyl)bis(triethylphosphine)nickel(II), trans-dichlorobis(triethylphosphine)nickel(II), trans-bromo(pentafluorophenyl)bis(triphenylphosphine)nickel(II), trans-chloro(2,5-dichlorophenyl)bis(triethylphosphine)nickel(II), trans-chloro(trifluorovinyl)bis(triphenylphosphine)nickel(II), trans-dibromobis(triethylphosphine)nickel(II), trans-diiodobis(tri-n-butylarsine)nickel(II), and combinations thereof.

The ligand materials which are suitable for utilization in the present process have the formula $$R'''_3Z$$

wherein Z is selected from the group consisting of phosphorus and arsenic, and wherein each $R'''$ is individually selected from the group consisting of alkyl radicals having from 1 to 12 carbon atoms and no branching nearer the Z than the second carbon atom. Exemplary suitable ligand materials include trimethylphosphine, triethylphosphine, tri-n-propylarsine, tri-n-butylphosphine, tri-n-hexylphosphine, tri-n-butylarsine, tri-n-octylphosphine, tri-n-decylphosphine, tri-n-dodecylphosphine, tri-n-dodecylarsine, dimethylethylphosphine, dimethylisobutylphosphine, diethylisopentylarsine, and combinations thereof. The nickel(II) compound and the ligand can be added as separate components or the ligand can be present as part of the nickel(II) compound.

The ratio of the gram atoms of nickel to the moles of alkyne compound will be at least sufficient to achieve a significant catalytic effect, and will generally be in the range of about 0.0001 to about 1, and preferably in the range of about 0.001 to about 0.2. The ratio of moles of the ligand to the gram atoms of nickel will be at least sufficient to achieve a significant effect from the addition of the ligand, and will generally be in the range of about 0.01 to about 20, preferably in the range of about 1 to about 8.

The reduction of the nickel(II) compound in the presence of the ligand can be accomplished by any suitable method known in the art. In one embodiment of the present invention the reduction of the nickel is effected, at least in part, by the presence of at least one suitable organometallic reducing agent or metal hydride reducing agent. These reducing agents include compounds of elements of Groups IA, IIA, IIB and IIIA of the Periodic Table of the Elements set forth on page B–2 of the *Handbook of Chemistry and Physics*, Chemical Rubber Co., 45th Edition, 1964. The compounds of lithium, sodium, potassium, magnesium, calcium, boron, and aluminum are presently preferred because of the greater availability at reasonable cost. Examples of suitable reducing agents include lithium hydride, sodium hydride, lithium aluminum hydride, sodium borohydride, calcium hydride, aluminum hydride, phenylsodium, phenyllithium, benzyl potassium, phenylmagnesium chloride, ethylmagnesium bromide, triethylaluminum, diisobutylaluminum hydride, diethylethoxyaluminum, phenylaluminum sesquichloride, diethylaluminum chloride, beryllium diethyl, magnesium diethyl, diborane, triethyl boron, diethyl zinc, and diethyl cadmium, and admixtures thereof.

When the reduction of the valence of the nickel is effected in the presence of an organometallic reducing agent or a metal hydride reducing agent, the amount of the organometallic reducing agent or metal hydride reducing agent employed will be at least sufficient to achieve the desired reduction. The mole ratio of reducing agent to nickel(II) compound will generally be in the range of about 2 to about 20, more preferably in the range of about 2 to about 8.

It has also been found that the reduction of the valence of the nickel can be effected in the presence of the conjugated diolefin and the alkyne compound, in the absence of an organometallic reducing agent or a metal hydride reducing agent, by heating the admixture to a temperature in the range of about 50° C to about 120° C, preferably in the range of about 60° C to about 100° C. The exact mechanism by which the reduction takes place under these conditions is not known with certainty, but it is thought possible that part of the alkyne feed acts as a reducing agent.

It has further been found that the valence of the nickel can be reduced in the presence of the conjugated diolefin, the alkyne compound and methanol and in the absence of an organometallic reducing agent or a metal hydride reducing agent. Again, the exact mechanism of the reduction is not known with certainty, and the presence of the methanol in the initial reactants has the apparent effect of increasing the ratio of benzene to 5-vinylcyclohexa-1,3-diene produced in the reaction of acetylene and butadiene. When methanol is employed, the mole ratio of methanol to nickel(II) compound will generally be in the range of about 1 to about 150, more preferably in the range of about 50 to about 100.

The nickel(0)-ligand catalyst can be formed in situ in the presence of the conjugated diolefin and the alkyne compound, or the catalyst can be preformed prior to contact with the conjugated diolefin and the alkyne compound.

If desired, a suitable solvent or diluent can be employed as the media for the reduction of the nickel valence and/or for the reaction of the conjugated diolefin and the alkyne compound. Exemplary solvents or diluents include benzene, toluene, cyclohexane, cumene, isoctane, methanol, ethyl acetate, acetone, di-n-butyl ether, and admixtures thereof. The solvent or diluent should not have significant potential for reacting with the catalyst components or with one of the feed components at the conditions under which the solvent is being utilized.

The reduction of the nickel catalyst and the oligomerization reaction can be effected at any suitable temperature and pressure. Generally the temperature for the reduction of the nickel in the presence of an organometallic or metal hydride reducing agent will be in the range of about −78° C to about 50° C, preferably in the range of about −78° C to about 0° C. When an organometallic reducing agent or metal hydride reducing agent is employed in the reduction of the nickel, the temperature for the oligomerization reaction will usually be in the range of about −15° C to about 100° C, and preferably in the range of about 0° C to about 30° C. A temperature in the range of about 50° C to about 120° C can be employed for both reactions when carried out in the absence of either an organometallic reducing agent or a metal hydride reducing agent, with the temperature range of about 60° C to about 100° C being presently preferred for both reactions. The pressure for both the reduction and the oligomerization will normally be in the range of about 5 to about 150 psig.

The desirable reaction time is a function of other variables, such as temperature, concentration, catalyst level, etc. In general, in a batch reaction, it is desirable to carry out the oligomerization reaction until no further significant pressure drop occurs, normally requiring about 0.5 to about 50 hours.

In a preferred embodiment of the present invention, the primary product of the oligomerization reaction is a 5-vinylcyclohexa-1,3-diene compound represented by the structure

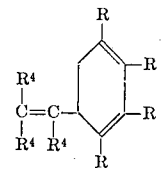

wherein each R is as defined hereinabove with respect to the alkyne compound, and each $R^4$ is hydrogen or methyl with at least two of the $R^4$'s being hydrogen. In presently preferred embodiments, at least 50 mole percent, and more preferably at least 60 mole percent, of the alkyne will be converted to this product. Other valuable products can also be produced in yields which are commercially significant. For example, in the reaction of butadiene and acetylene, significant amounts of benzene can be produced.

The following examples are presented in further illustration of the invention, but should not be construed in undue limitation thereof. In each run of the examples, the reactions were carried out under a nitrogen atmosphere with anhydrous reagents and in dry, deoxygenated solvent. Phillips pure grade butadiene was used as the diolefin. The acetylene employed in the runs had been passed through two −78° C traps to remove any acetone. The acetylene-butadiene reactions were conducted in a thick-walled glass bottle of 3 oz. capacity fitted with a stainless steel cap and sealed by a neoprene rubber O-ring. Each cap was fitted with a pressure gauge, a gas inlet-outlet port, and a vertical tubular serum-stoppered port encompassing a ball type stopcock through which a syringe needle could be passed.

EXAMPLE I

In each of the following series of runs 0.10 g (0.39 mmol) of nickel acetylacetonate, 10.0 ml of cyclohexane, and the desired quantity of a tert-phosphine, if used, were added to a previously dried reaction bottle. The bottle was then capped, flushed with nitrogen, partially evacuated, and cooled to about −78° C. Then 10.8 g (200 mmol) of butadiene and 1.3 g (50 mmol) of acetylene were introduced into the bottle, followed by 0.80 ml of 25 wt. percent triethylaluminum in cyclohexane, by syringe through the vertical port. Then the ball valve was closed, and the mixture was warmed to 25° C and magnetically stirred until the pressure dropped from the initial value of about 70 psig to less than 15 psig. The unreacted gases were vented, and the crude, liquid product mixture, spiked with ethylbenzene as a standard, was analyzed by gas liquid partition chromatography isothermally at 95° C and at 140° C. The results are reported in the following table:

TABLE I

| Run | Ligand | L:Ni (a) | B:A (b) | Temp. °C | Time Hr. | % Yield Based on Acetylene | | | | % Yield Based on Butadiene | | Yield in Grams Of Other Products (i) |
|-----|--------|----------|---------|----------|----------|------|------|------|------|------|------|------|
| | | | | | | VCHD (c) | COT (d) | BZ (e) | STy (f) | VCH (g) | COD (h) | |
| 1 | None | None | 4 | 25 | 42 | 4 | 1 | 5 | <1 | <1 | —* | <0.01 |
| 2 | P(Et)₃ | 2 | 4 | 25 | 6 | 59 | <1 | 16 | 5 | <1 | — | 0.11 |
| 3 | P(Ph)₃ | 2 | 4 | 25 | 69 | 46 | 2 | 26 | 1 | 1 | 1 | 0.09 |
| 4 | P(OPh)₃ | 2 | 4 | 25 | 17 | <1 | <1 | 2 | 1 | <1 | <1 | <0.01 |
| 5 | P(n-Bu)₃ | 1 | 4 | 25 | 16 | 61 | <1 | 22 | 1 | <1 | — | 0.06 |
| 6 | P(n-Bu)₃ | 4 | 4 | 25 | 6 | 66 | <1 | 15 | 1 | <1 | — | 0.06 |
| 7 | P(n-Bu)₃ | 8 | 4 | 25 | 22 | 41 | <1 | 12 | 1 | <1 | — | 0.02 |
| 8 | P(n-Bu)₃ | 2 | 1 | 25 | 3 | 56 | 1 | 22 | 1 | <1 | — | 0.32 |

* A dash indicates that the presence of this component was not detected.
(a) Ratio of moles of ligand to gram atoms of nickel.
(b) Mole ratio of butadiene to acetylene.
(c) 5-Vinylcyclohexa-1,3-diene.
(d) 1,3,6-Cyclooctatriene.
(e) Benzene.
(f) Styrene.
(g) 4-Vinylcyclohexene.
(h) 1,5-Cyclooctadiene.
(i) Products detected by gas liquid partition chromatography.

In run 1, the absence of a ligand is accompanied by low yields. In run 3, the reaction is relatively slow in the presence of a triarylphosphine ligand. In run 4, the presence of a phosphite ligand is accompanied by low yields. Runs 2, 5, 6, 7 and 8 demonstrate the high yields achievable in accordance with the present invention. 4-Vinylcyclohexene, benzene, 1,5-cyclooctadiene, and styrene were identified by comparison of glpc retention times with those of authentic samples and by combination glpc-mass spectral analysis. 5-Vinylcyclohexa-1,3-diene and 1,3,6-cyclooctatriene were isolated by preparative gas liquid partition chromatography and were identified from their mass and nmr spectra. 5-Vinylcyclohexa-1,3-diene could also be isolated by distillation: bp 63°–66° (90 mm).

As shown in Table I, the highest selectivity to 5-vinylcyclohexa-1,3-diene occurs with tri-n-alkylphosphines at $R_3P:Ni$ mole ratios between 1:1 and 4:1. At low butadiene to acetylene mole ratios, reaction times are shortened and reaction temperatures below 25° may be used, but the selectivity to 5-vinylcyclohexa-1,3-diene suffers and the benzene yield increases.

EXAMPLE II

A predried pressure bottle was charged with 0.10 g (0.36 mmol) of bis(1,5-cyclooctadiene)nickel(0) and capped in a dry box. After partially evacuating the bottle and cooling it to −78°, 0.80 mmol of P(n-Bu)₃ in 6 ml of cyclohexane was syringed into the bottle, and the ball stopcock was closed. Then 12.7 g (235 mmol) of butadiene and 1.5 g (58 mmol) of acetylene were added, the bottle was warmed to 25°, and the reaction was carried out for 4 hours at 25° C. The reaction solution was analyzed as in Example I. The results are as follows:

TABLE II

| Product | % Yield Based on Acetylene | % Yield Based on Butadiene |
|---------|---------------------------|----------------------------|
| 5-Vinylcyclohexa-1,3-diene | 52 | |
| 1,3,6-Cyclooctatriene | <1 | |
| Benzene | 18 | |
| 4-Vinylcyclohexene | | <1 |

EXAMPLE III

In each of the following runs, a predried pressure bottle was charged with cyclohexane, the nickel(II) compound (if any), a tert-phosphine (if any), 1–2 ml of methanol (if any), butadiene, and acetylene as in Example I. As the mixture was stirred, its temperature was increased (the bottle was immersed in a heated oil bath) until the system pressure began to decrease. After no further reaction was apparent, the reaction solution was cooled and then analyzed as in Example I. Results are reported in the following table:

TABLE III

| Run | 1 | 2 | 3 | 4 | 5 |
|-----|---|---|---|---|---|
| Nickel compound | (Et₃P)₂Ni(o-tolyl)Br | nickel acetylacetonate | nickel acetylacetonate | (Et₃P)₂NiCl₂ | None |
| Amount, mmol | 1.1 | 0.39 | 0.39 | 0.274 | |
| Ligand(a) P(n-Bu)₃ | See above | P(n-Bu)₃ | | | |
| Amount, mmol | See above | P(n-Bu)₃ 0.77 | 0.77 | | 1.09 |
| Butadiene, mmol | 200 | 200 | 200 | 200 | 200 |
| Acetylene, mmol | 50 | 50 | 50 | 50 | 50 |
| Methanol, ml | 1.5 | 2.0 | None | 2.0 | None |
| Reaction Temperature, °C | 50 | 70 | 80 | 90 | 80 |
| Reaction Time, hr. | 18 | 16 | 6 | 44 | 5 |
| Products | | | | | |
| (1) % Yield based on Acetylene | | | | | |
| 5-Vinylcyclohexa-1,3-diene | 27 | 50 | 45 | 15 | —* |
| 1,3,6-Cyclooctatriene | <1 | <1 | <1 | <1 | —* |
| Benzene | 17 | 32 | 10 | 12 | 0.5 |
| Styrene | 2 | 4 | 1 | ND(b) | —* |
| (2) % Yield Based on Butadiene | | | | | |
| 4-Vinylcyclohexene | <1 | ND(b) | 1 | ND(b) | 0.5 |
| 1,5-Cyclooctadiene | <1 | ND(b) | <1 | <1 | —* |

*A dash indicates that the presence of this compound was not detected.
(a) P(n-Bu)₃ is tri-n-butylphosphine.
(b) ND indicates the yield of this compound was not determined.

That which is claimed is:

1. A method for producing 5-vinylcyclohexa-1,3-diene which comprises reacting under suitable reaction conditions reactants consisting essentially of butadiene and acetylene in contact with a catalyst selected from the group consisting of:
   a. a reaction product obtained by the reduction of a nickel(II) compound in contact with a ligand having the formula $R_3Z$ wherein Z is selected from the group consisting of phosphorus and arsenic, and each R is individually selected from the group consisting of alkyl radicals having from 1 to 12 carbon atoms and no branching nearer the Z than the second carbon atom, said nickel(II) compound being selected from the group consisting of nickel chloride, nickel bromide, nickel acetate, nickel iodide, nickel propionate, nickel cyanide, nickel benzoate, nickel naphthenate, nickel oxalate, nickel acetylacetonate, nickel benzoylacetonate, and combinations thereof;
   b. a mixture of bis(1,5-cyclooctadiene)nickel(0) and tri-n-butyl phosphine; and
   c. a reaction product obtained by the reduction of a nickel(II) complex selected from the group consisting of trans-bromo(o-tolyl)bis(triethylphosphine)nickel(II), trans-dichlorobis(triethylphosphine)nickel(II), trans-chloro(2,5-dichlorophenyl)bis(triethylphosphine)nickel(II), trans-dibromobis(triethylphosphine)nickel(II), trans-diiodobis(tri-n-butylarsine)nickel(II), and combinations thereof;
   to produce 5-vinylcyclohexa-1,3-diene as a principal product of the reaction.

2. A method in accordance with claim 1 wherein said catalyst is the reaction product obtained by the reduction of nickel acetylacetonate in contact with a ligand selected from the group consisting of triethyl phosphine and tri-n-butyl phosphine.

3. A method in accordance with claim 2 wherein the reduction is accomplished by the addition of an organometallic reducing agent.

4. A method in accordance with claim 3 wherein said reaction conditions comprise a temperature in the range of about 0° C to about 30° C.

5. A method in accordance with claim 1 wherein said catalyst is a mixture of bis(1,5-cyclooctadiene)nickel(0) and tri-n-butyl phosphine.

6. A method in accordance with claim 5 wherein said reaction conditions comprise a temperature in the range of about 0° C to about 30° C.

7. A method in accordance with claim 1 wherein said catalyst is the reaction product obtained by the reduction of trans-bromo(o-tolyl)bis(triethylphosphine)nickel(II).

8. A method in accordance with claim 7 wherein the reduction is accomplished by heating the nickel complex in the presence of butadiene, acetylene, and methanol to a temperature in the range of about 50° C to about 120° C.

9. A method in accordance with claim 2 wherein the reduction is accomplished by heating the nickel compound in the presence of butadiene and acetylene to a temperature in the range of about 50° C to about 120° C.

10. A method in accordance with claim 1 wherein said catalyst is the reaction product obtained by the reduction of trans-dichlorobis(triethylphosphine)nickel(II), and the reduction is accomplished by heating the nickel complex in the presence of butadiene and acetylene to a temperature in the range of about 50° C to about 120° C.

* * * * *